United States Patent
Mao et al.

(10) Patent No.: US 11,132,770 B2
(45) Date of Patent: Sep. 28, 2021

(54) IMAGE PROCESSING METHODS AND APPARATUSES, COMPUTER READABLE STORAGE MEDIA AND ELECTRONIC DEVICES

(71) Applicant: SHENZHEN SENSETIME TECHNOLOGY CO., LTD, Shenzhen (CN)

(72) Inventors: Xiangyu Mao, Shenzhen (CN); Qiong Yan, Shenzhen (CN); Wenxiu Sun, Shenzhen (CN); Sijie Ren, Shenzhen (CN)

(73) Assignee: SHENZHEN SENSETIME TECHNOLOGY CO., LTD, Shenzhen (CN)

( * ) Notice: Subject to any disclaimer, the term of this patent is extended or adjusted under 35 U.S.C. 154(b) by 122 days.

(21) Appl. No.: 16/456,169

(22) Filed: Jun. 28, 2019

(65) Prior Publication Data

US 2019/0318457 A1    Oct. 17, 2019

Related U.S. Application Data

(63) Continuation of application No. PCT/CN2018/113220, filed on Oct. 31, 2018.

(30) Foreign Application Priority Data

Dec. 20, 2017    (CN) .......................... 201711387927.5

(51) Int. Cl.
*G06T 5/50*    (2006.01)
*G06T 5/00*    (2006.01)
*G06T 5/20*    (2006.01)

(52) U.S. Cl.
CPC ................ *G06T 5/002* (2013.01); *G06T 5/20* (2013.01); *G06T 5/50* (2013.01); *G06T 2207/10004* (2013.01); *G06T 2207/10028* (2013.01)

(58) Field of Classification Search
CPC combination set(s) only.
See application file for complete search history.

(56) References Cited

U.S. PATENT DOCUMENTS

| 9,311,901 B2 | 4/2016 | Webster et al. |
| 2005/0129305 A1* | 6/2005 | Chen ........................ G06T 7/596 |
| | | 382/154 |

(Continued)

FOREIGN PATENT DOCUMENTS

| CN | 101272511 A | 9/2008 |
| CN | 104104869 A | 10/2014 |

(Continued)

OTHER PUBLICATIONS

International Search Report in the international application No. PCT/CN2018/113220, dated Dec. 29, 2018.

(Continued)

*Primary Examiner* — Tsung Yin Tsai
(74) *Attorney, Agent, or Firm* — Syncoda LLC; Feng Ma

(57) ABSTRACT

An image processing method includes: obtaining an original photographed image and original depth information of at least one pixel point in the original photographed image; determining blurring degree data of each of the at least one pixel point in the original photographed image according to blurring parameter data and the original depth information of the at least one pixel point; and performing blurring processing on the original photographed image according to the blurring degree data of the at least one pixel point to generate a post-processing result image.

20 Claims, 13 Drawing Sheets

(56) References Cited

U.S. PATENT DOCUMENTS

| | | | | |
|---|---|---|---|---|
| 2012/0219236 A1* | 8/2012 | Ali | ............... | G06T 5/002 |
| | | | | 382/276 |
| 2013/0004082 A1* | 1/2013 | Kano | ............... | G06T 5/002 |
| | | | | 382/195 |
| 2013/0033582 A1* | 2/2013 | Sun | ............... | H04N 13/122 |
| | | | | 348/47 |
| 2013/0034297 A1* | 2/2013 | Papp | ............... | G06T 7/571 |
| | | | | 382/154 |
| 2013/0050429 A1* | 2/2013 | Suzuki | ............... | H04N 13/271 |
| | | | | 348/46 |
| 2015/0002545 A1* | 1/2015 | Webster | ............... | G06T 11/60 |
| | | | | 345/634 |
| 2016/0328853 A1* | 11/2016 | Wu | ............... | G06T 7/50 |
| 2019/0130536 A1* | 5/2019 | Yan | ............... | G06T 5/50 |

FOREIGN PATENT DOCUMENTS

| | | |
|---|---|---|
| CN | 105163042 A | 12/2015 |
| CN | 106060423 A | 10/2016 |
| CN | 106412421 A | 2/2017 |
| CN | 106993091 A | 7/2017 |
| CN | 106993112 A | 7/2017 |
| CN | 107426493 A | 12/2017 |
| CN | 107454332 A | 12/2017 |
| CN | 107493432 A | 12/2017 |
| CN | 108234865 A | 6/2018 |
| JP | 2001057630 A | 2/2001 |
| JP | 2014102614 A | 6/2014 |
| JP | 2016032181 A | 3/2016 |
| JP | 2016039563 A | 3/2016 |
| JP | 2016162376 A | 9/2016 |

OTHER PUBLICATIONS

First Office Action of Chinese application No. 201711387927.5, dated Jun. 17, 2019.

Japan First Office Action in application No. 2019-553910, dated Oct. 13, 2020.

* cited by examiner

IMAGE PROCESSING METHODS AND APPARATUSES, COMPUTER READABLE STORAGE MEDIA AND ELECTRONIC DEVICES

CROSS-REFERENCE TO RELATED APPLICATIONS

The present application is a U.S. continuation application of International Application No. PCT/CN2018/113220 filed on Oct. 31, 2018, which claims benefit of Chinese Patent Application No. 201711387927.5 filed on 20 Dec. 2017. The disclosures of these applications are hereby incorporated by reference in their entirety.

BACKGROUND

In the process of using a camera (including a camera in a mobile phone) to photograph, parameter adjustments (such as a focus point) of the camera can greatly affect the quality of pictures. However, when taking pictures, non-professional users generally cannot adjust the parameters well to achieve the desired photographing results. The image background blurring technologies recently occurred allow users to take pictures that simulate the large aperture blurring effect of single-lens reflex cameras.

However, in many cases, the use of image background blurring technologies in the photographing process still cannot meet the needs of the users.

SUMMARY

Embodiments of the present disclosure relates to image combing technologies, and in particular, to image processing methods and apparatuses, computer readable storage media and electronic devices.

Embodiments of the present disclosure provide an image processing technology.

According to a first aspect of the embodiments of the present disclosure, provided is an image processing method, including: obtaining an original photographed image and a depth image corresponding to the original photographed image; storing the original photographed image and the depth image; and performing blurring processing on the original photographed image by using the stored depth image to generate a post-processing result image.

According to a second aspect of the embodiments of the present disclosure, provided is an image processing method, including: obtaining an original photographed image and original depth information of at least one pixel point in the original photographed image; determining blurring degree data of each of the at least one pixel point in the original photographed image according to blurring parameter data and the original depth information of the at least one pixel point; and performing blurring processing on the original photographed image according to the blurring degree data of the at least one pixel point to generate a post-processing result image.

According to a third aspect of the embodiments of the present disclosure, provided is an image processing apparatus, including: a memory storing processor-executable instructions; and a processor, configured to execute the stored processor-executable instructions to perform operations of: obtaining an original photographed image and a depth image corresponding to the original photographed image; storing the original photographed image and the depth image; and performing blurring processing on the original photographed image by using the stored depth image to generate a post-processing result image.

According to a fourth aspect of the embodiments of the present disclosure, provided is an image processing apparatus, including: an original depth image obtaining module configured to obtain an original photographed image and a depth image corresponding to the original photographed image; a storage module configured to store the original photographed image and the depth image; and a blurring processing module configured to perform blurring processing on the original photographed image by using the depth image to generate a post-processing result image.

According to a fifth aspect of the embodiments of the present disclosure, provided is an image processing apparatus, including: an image data obtaining module configured to obtain an original photographed image and original depth information of at least one pixel point in the original photographed image; a blurring degree determining module configured to determine blurring degree data of each of at least one pixel point in the original photographed image according to blurring parameter data and the original depth information of the at least one pixel point obtained by the image data obtaining module; and a blurring processing module configured to perform blurring processing on the original photographed image according to the blurring degree data of the at least one pixel point determined by the blurring degree determining module to generate a post-processing result image.

According to a sixth aspect of the embodiments of the present disclosure, provided is an electronic device, including a processor, a memory, a communication element, and a communication bus, where the processor, the memory, and the communication element communicate with each other by means of the communication bus, and the memory is configured to store at least an executable instruction which enables the processor to execute any one of the foregoing image processing methods.

According to a seventh aspect of the embodiments of the present disclosure, provided is a computer readable storage medium having a computer program instruction stored thereon, where the program instruction is executed by the processor to implement any one of the foregoing image processing methods.

According to an eighth aspect of the embodiments of the present disclosure, provided is a computer program, including a computer program instruction, where the program instruction is executed by the processor to implement any one of the foregoing image processing methods.

According to a ninth aspect of the embodiments of the present disclosure, provided is a computer program product for storing a computer readable instruction, where when the instruction is executed, the computer executes the image processing method according to any one of the possible implementations.

DETAILED DESCRIPTION

In the present disclosure, "multiple" refers to two or more, and "at least one" refers to one, two or more. Any component, data or structure mentioned in the present disclosure may be understood as one or more if it is not explicitly defined. Exemplary embodiments of embodiments of the present disclosure will be described in detail below with reference to the accompanying drawings.

Figure 1A:
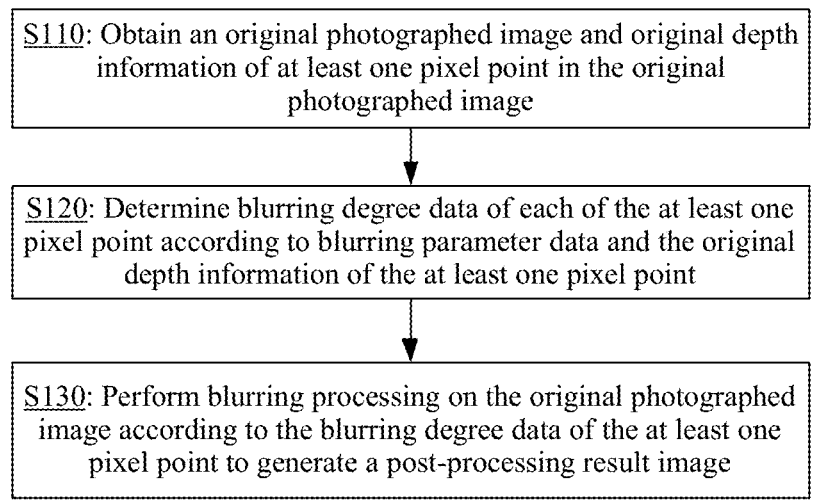
FIG. 1A is a flowchart illustrating an image processing method according to embodiments of the present disclosure.

FIG. 1A is a flowchart illustrating an image processing method according to embodiments of the present disclosure. The method may be used for post-processing of images.

Referring to FIG. 1A, at S110, an original photographed image and original depth information of at least one pixel point in the original photographed image are obtained.

Here, the original photographed image is an original image photographed by a photographing apparatus. In some examples, the photographing apparatus can photograph with a specific photographing setting, for example, photographing may be performed by using specific focus data and/or blurring aperture data, etc., to obtain the original photographed image.

Multiple original photographed images taken from the same scene may have different effects according to the photographing settings of the photographing device. For example, the original photographed images have different effects by using different photographing lenses or different photographing parameter values (such as focal length, aperture, white exposure, etc.).

The at least one pixel point may be one or more pixel points in the original photographed image, for example, the at least one pixel point may be all pixel points in the original photographed image, or may be part of the pixel points in the original photographed image, which is not limited herein.

In one or more examples, an original depth value of each of the at least one pixel point may be obtained, where an original depth value of a certain pixel point may refer to a corresponding depth value of the pixel point in the original photographed image. Alternatively, a parameter for indicating an original depth value of each of the at least one pixel point may be obtained. Alternatively, a depth image corresponding to the original photographed image may be obtained, where the depth image may include the original depth value of each of the at least one pixel point. Alternatively, the obtained original depth information may also be embodied in other manners, which is not limited herein.

According to an optional implementation, the original depth information of at least one pixel point may also be obtained in the process of photographing the original photographed image or after obtaining the original photographed image. In one or more optional examples, a photographing device or a sensor may be used to obtain original depth information for at least one pixel point. For example, iphone10 structured light, Microsoft's Kinect, Time of Flight (TOF) cameras, some infrared cameras or infrared sensors, etc., may be used to obtain depth information and/or generate depth images. Alternatively, the depth information of the original photographed picture can also be obtained by using a dual camera. For example, two original pictures input may be corrected according to camera parameters of the dual camera, and depth information corresponding to pixel points in a main picture is calculated according to the position difference of the corresponding points in the two original pictures, but is not limited thereto.

In one or more optional examples, after the original photographed image and a corresponding depth image thereof and/or original depth information of at least one pixel point are obtained initially, the original photographed image and the original depth information and/or the depth image may be stored, and correspondingly, in S110, the stored original photographed image and/or the original depth information may be specifically obtained, or the stored depth image may be obtained and the original depth information may be obtained from the depth image, which is not limited in the embodiments.

In one or more optional examples, in S110, the original photographed image and/or the original depth information of at least one pixel point may be read from a preset image library, and the original photographed image and/or the original depth information of at least one pixel point may be read from a storage position specified by a user, or the original photographed image provided by the user and/or the original depth information of at least one pixel point can also be received, etc., which is not limited to the foregoing manners.

At S120, blurring degree data of each of the at least one pixel point is determined according to blurring parameter data and the original depth information of the at least one pixel point.

Here, the blurring parameter data may include parameter data related to performing blurring processing on the original photographed image, such as, but not limited to, focus data, a blurring aperture value, blurring strength data, etc. In one or more optional examples, the blurring parameter data specified by the user (such as a focus point or a focus area clicked by the user on the image display interface) may be obtained by means of a user interaction interface, and the blurring parameter data may be determined according to a predetermined image processing effect, or the blurring parameter data may be determined by means of other methods, and the methods of determining the blurring parameter data is not limited.

In some examples, the blurring degree data may indicate a blurring degree that is to be achieved by performing blurring processing on the pixel points in the original photographed image. In one or more optional examples, the blurring degree data includes, but is not limited to, diameter lengths such as a blurring radius or diameter. The blurring diameter length includes, but is not limited to, information such as a radius or diameter of a circle of confusion of the pixel point after blurring. The specific parameter type included in the blurring degree data may be determined according to the actual blurring method, and the specific implementation of the blurring degree data is not limited.

In one or more optional examples, adjustment processing is performed on the original depth value of at least one pixel point indicated by the original depth information according to the determined blurring parameter data to obtain an adjusted depth value of the at least one pixel point, and the blurring degree data of the at least one pixel point is determined according to the adjusted depth value of the at least one pixel point.

In some examples, the adjusted depth value of a certain pixel point may be equal to or different from the original depth value thereof, which is not limited thereto.

In some embodiments, adjustment processing is performed on the original depth value of the at least one pixel point with various manners. For example, adjustment processing is performed on the original depth value of the pixel point according to the blurring mode, but is not limited thereto.

In one optional example, an adjusted depth value of a first pixel point of the at least one pixel point is set to a difference between an original depth value of the first pixel point and a depth value of a focus point, and an adjusted depth value of a second pixel point of the at least one pixel point is set to 0, where the original depth value of the first pixel point is greater than the depth value of the focus point, and the original depth value of the second pixel point is less than the depth value of the focus point.

In this case, the depth value of the pixel point which is greater than the depth value of the focus point is adjusted to a difference between the depth value of the pixel point and the depth value of the focus point, and the depth value of the pixel point which is less than the depth value of the focus point is adjusted to 0, so that the focus point and an area in front of the focus point are clear, and for an area behind the focus point, the farther away from the focus point, the more blurred the area is.

In another optional example, the adjusted depth value of a pixel point is set to an absolute difference value between the original depth value of the pixel point and the depth value of the focus point. In this case, the focus point is kept clear, while the areas in front of and behind the focus point are blurred, and the farther away from the focus point, the more blurred the area is.

In some examples, the two examples described above are only for persons skilled in the art to better understand the technical solutions of the present disclosure. However, the depth values of the pixel points may also be adjusted in other methods, which is not limited herein.

At S130, blurring processing is performed on the original photographed image according to the blurring degree data of the at least one pixel point to generate a post-processing result image.

After generating the blurring degree data such as the blurring radius, the diameter, and other diameter lengths for the at least one pixel point, respectively, blurring processing is performed on corresponding pixel points of the original photographed image according to the blurring degree data, such as, for example, Gaussian blur filtering processing, a circular blur process etc., to generate a post-processing result image having a desired blurring effect. Thereafter, the post-processing result image may be presented to the user or stored, for example, in an image library.

In some embodiments, blurring processing is performed in various blurring methods, such as, for example, a circular blur method, a Gaussian blur method, or an average blur method, etc., which is not limited herein. In one optional example, the blurring radius data of at least one pixel point may be used as a parameter value of a Gaussian kernel function, and blurring processing is performed on at least one pixel point of the original photographed image by using a Gaussian blur method to generate a post-processing result image. In another optional example, an average kernel width of each of the at least one pixel point is determined according to the blurring radius data of the at least one pixel point, and blurring processing is performed on the at least one pixel point of the original photographed image by using an average blur method to generate a post-processing result image. In another optional example, the blurring radius data of the at least one pixel point is used as a circle radius value, and blurring processing is performed on the at least one pixel point of the original photographed image by using a circular blur method to generate a post-processing result image.

According to some embodiments, for the photographed image (i.e., the original photographed image), blurring processing is performed on the original photographed image by re-determining the desired blurring parameter data for the blurring processing to obtain a post-processing result image having a desired blurring processing effect. In this case, under circumstances where the photographing effect image generated in the photographing process cannot meet the user's needs, for example, an error may occur when a photographing apparatus automatically calculates the depth or parameter of the photo (for example, the focus point is mistakenly set on a background character instead of a foreground character), and the blurring result does not meet the expectations of the user, etc., post-processed may be performed by means of the scheme of some embodiments to obtain an image having a desired blurring effect. In addition, according to some embodiments, multiple post-processing result images having different image effects may be obtained from a same original photographed image by defining different blurring parameter data.

Figure 8:
FIG. 8 is a schematic diagram illustrating a processing effect obtained by the image photographing method according to embodiments of the present disclosure.

FIG. 8 is a schematic diagram illustrating a processing effect obtained by the image photographing method according to some embodiments of the present disclosure. Image 810A is an effect image obtained by taking the collar of a jacket as a focus area during photographing. Image 810B is a blurring effect image obtained by performing the processing of S110-S130 with another focus area selected at the far end of the scene after the completion of the photographing. Similarly, image 820A is an effect image obtained by processing a focus area at the far end of the scene during photographing. Image 820B is a blurring effect image obtained by processing the focus area re-selected at the near end of the scene at S110-S130 after the completion of the photographing. In view of the above, according to the image processing method of the embodiments of the present disclosure, after the image capturing is completed, the image blurring processing is performed by blurring the original photographed image to obtain a post-processing result image having different image effects.

According to the image processing method provided by the foregoing embodiments, for the previously photographed image (the original photographed image), the blurring degree data may be obtained for at least one pixel point in the original photographed image according to the re-determined blurring parameter and the depth information corresponding to the original photographed image, and then blurring processing is performed on the pixel point in the original photographed image according to the obtained blurring degree data to generate a post-processing result image, so that the post-processing result image having a desired effect may be obtained by processing the original photographed image. In addition, the post-processing result image having different blurring effects may be repeatedly generated by the foregoing method.

Figure 1B:
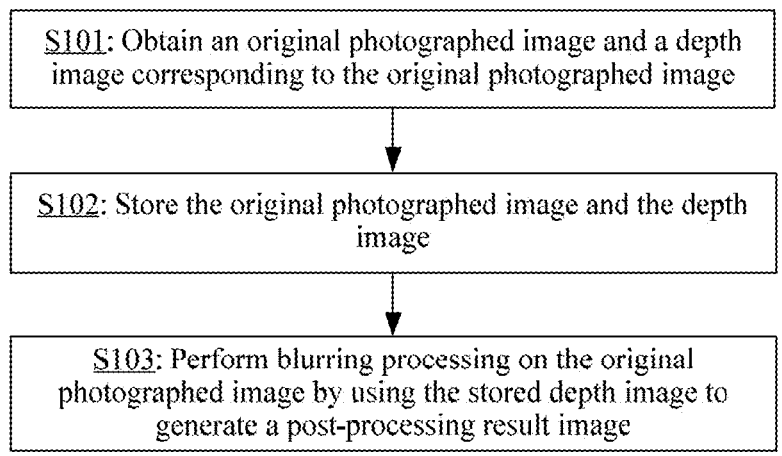
FIG. 1B is a flowchart illustrating an image processing method according to embodiments of the present disclosure.

FIG. 1B is a flowchart illustrating an image processing method according to embodiments of the present disclosure. The method may be used for post-processing of images. Referring to FIG. 1B, the method includes:

Step S101: an original photographed image and a depth image corresponding to the original photographed image are obtained;

Step S102: the original photographed image and the depth image are stored; and

Step S103: blurring processing is performed on the original photographed image by using the stored depth image to generate a post-processing result image.

In some examples, the depth image includes original depth information of at least one pixel point in the original photographed image. The performing blurring processing on the original photographed image by using the depth image to generate a post-processing result image includes:

determining blurring degree data of each of at least one pixel point in the original photographed image according to blurring parameter data and the original depth information of the at least one pixel point; and performing blurring processing on the original photographed image according to the blurring degree data of the at least one pixel point to generate a post-processing result image.

In some examples, the blurring parameter data includes focus data and blurring intensity data. The determining blurring degree data of each of at least one pixel point in the original photographed image according to blurring parameter data and the original depth information of the at least one pixel point includes:

performing, according to the focus data, adjustment processing on an original depth value corresponding to the original depth information of the at least one pixel point to obtain an adjusted depth value of each of the at least one pixel point; and obtaining the blurring degree data of each pixel point according to the blurring intensity data and the adjusted depth value of the pixel point.

In some examples, the performing, according to the focus data, adjustment processing on an original depth value corresponding to the original depth information of the at least one pixel point to obtain an adjusted depth value of each of the at least one pixel point includes:

setting an adjusted depth value of a first pixel point of the at least one pixel point to a difference between an original depth value of the first pixel point and a depth value of a focus point corresponding to the focus data, and setting an adjusted depth value of a second pixel point of the at least one pixel point to 0, where the original depth value of the first pixel point is greater than the depth value of the focus point, and the original depth value of the second pixel point is less than the depth value of the focus point.

In some examples, the performing, according to the focus data, adjustment processing on an original depth value corresponding to the original depth information of the at least one pixel point to obtain an adjusted depth value of each of the at least one pixel point includes:

setting the adjusted depth value of each pixel point as an absolute difference value between an original depth value of the pixel point and a depth value of a focus point corresponding to the focus data.

In some examples, the blurring degree data includes blurring radius data.

The performing blurring processing on the original photographed image according to the blurring degree data of the at least one pixel point to generate a post-processing result image includes:

using the blurring radius data of the at least one pixel point as a parameter value of a Gaussian kernel function, and performing blurring processing on the at least one pixel point of the original photographed image by using a Gaussian blur method to generate a post-processing result image; or determining an average kernel width of each of the at least one pixel point according to the blurring radius data of the at least one pixel point, and performing blurring processing on the at least one pixel point of the original photographed image by using an average blur method to generate a post-processing result image; or using the blurring radius data of the at least one pixel point as a circle radius value, and performing blurring processing on the at least one pixel point of the original photographed image by using a circular blur method to generate a post-processing result image.

In some examples, the method further includes: displaying the post-processing result image; and/or storing the post-processing result image.

In some examples, before performing adjustment processing on an original depth value of at least one pixel point in the original photographed image indicated by the depth image, the method further includes: obtaining the focus data specified by a user; and/or obtaining the blurring intensity data specified by the user.

In some examples, the storing the original photographed image and the depth image includes: associatively storing the original photographed image and the depth image in an image library.

In some examples, the associatively storing the original photographed image and the depth image in an image library includes: associatively storing the original photographed image and the depth image in the image library as separate image files; or storing the original photographed image and the depth image in a first merged image file of the image library.

In some examples, the storing the original photographed image and the depth image includes: associatively storing the original photographed image, the depth image, and an original photographed effect image in the image library as separate image files.

In some examples, the storing the original photographed image and the depth image includes: storing the original photographed image, the depth image, and the original photographed effect image in a second merged image file.

In some examples, the storing the original photographed image, the depth image, and the original photographed effect image in a second merged image file includes:

writing the original photographed image and the depth image behind the original photographed effect image.

In some examples, a file header of the second merged image file includes information indicating a length of the original photographed effect image and/or the original photographed image.

In some examples, the method further includes: in response to an image display command, extracting the original photographed effect image from the second merged image file according to a size of the original photographed effect image, and displaying the original photographed effect image.

Figure 2:
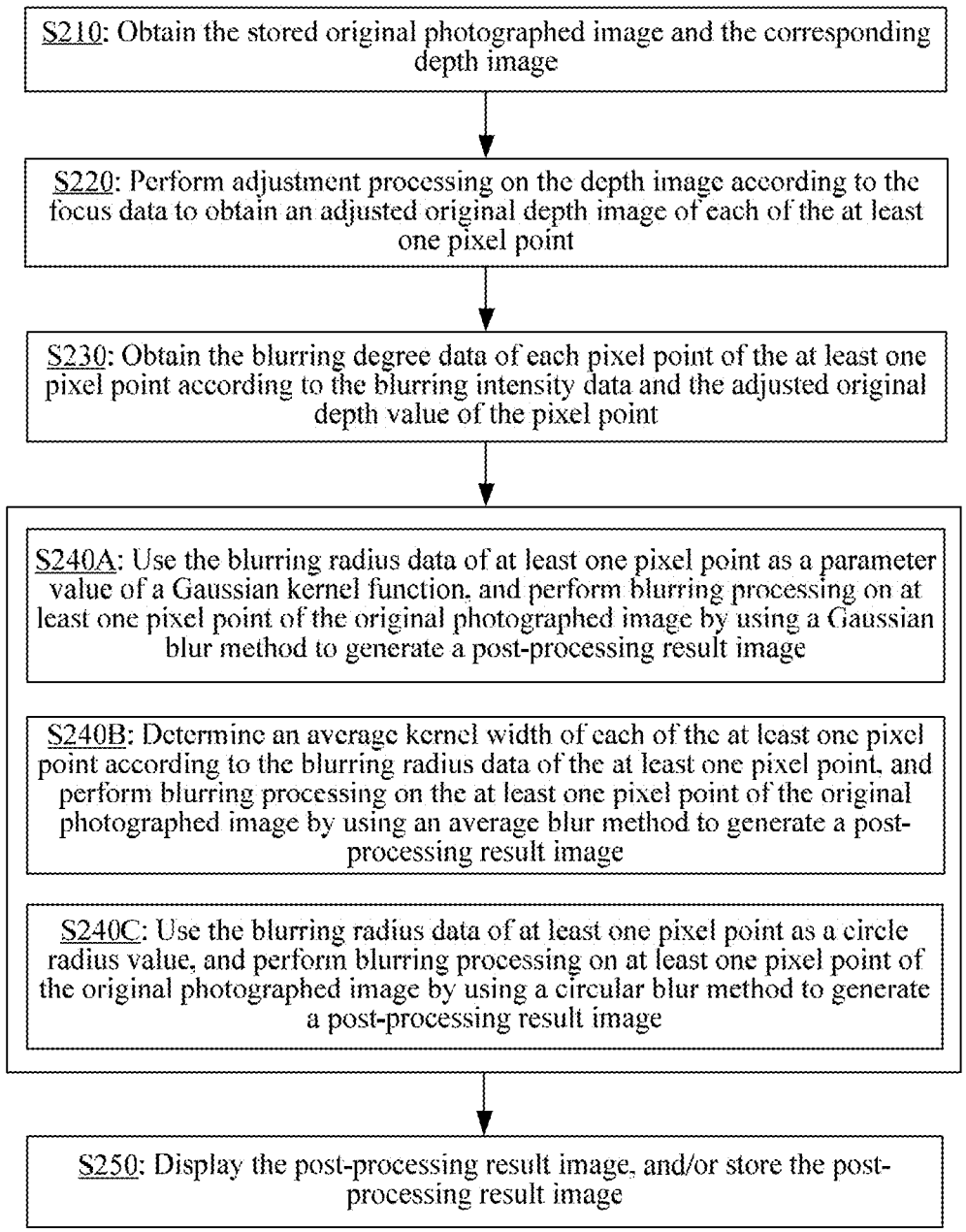
FIG. 2 is a flowchart illustrating an image processing method according to embodiments of the present disclosure.

FIG. 2 is a flowchart illustrating an image processing method according to embodiments of the present disclosure. For example, an interaction item for executing the image processing method of the present disclosure is provided for the user, and when it is detected that the user intends to execute an operation such as refocusing or defining a blurring aperture value for a certain photographed image (e.g., the original photographed image), the execution of the processing of S210 is triggered.

Referring to FIG. 2, at S210, the stored original photographed image and the corresponding depth image are obtained.

According to the general inventive concept of the present disclosure, the adjustment processing of at least one pixel point is performed on the original photographed image that has been photographed, according to the desired blurring parameter and the corresponding depth information, and the blurring effect processing is performed accordingly. Therefore, when the photographing is completed, it is usually necessary to store the original photographed image and the corresponding depth information together. In some examples, the original photographed image and the depth image including the depth information are associatively stored in an image library.

According to a feasible implementation, the original photographed image and the depth image are associatively stored in the image library as separate image files, respectively. Accordingly, when the user browses the image library, the original photographed image and the corresponding depth image may be seen.

The advantages of this method at least include the flexibility to provide users with image operation. Professional users can correct calculation errors in depth images according to their professional knowledge, or replace depth images calculated during photographing with depth images obtained by, for example, professional systems or software, to obtain a better post-processing blur effect.

In some examples, the original photographed image and the corresponding depth image are stored as two hidden image files associated in the image library. For example, a specific file naming prefix or suffix is used to name the depth image and the original photographed image, so that these files are not visible to the user, but may be read.

According to another feasible implementation, the original photographed image and the depth image are stored in a first merged image file of the image library. Accordingly, when browsing the image library, the user sees the first merged image file containing the original photographed image and the depth image. If the original photographed image is to be fetched separately, the original photographed image needs to be intercepted out from the first merged image file.

At S220, adjustment processing is performed on the depth image according to the focus data to obtain an adjusted original depth image of each of the at least one pixel point.

Here, in addition to the foregoing focus data, the blurring aperture value, and/or the blurring intensity data, the blurring parameter data may further include blurring mode data for indicating a blurring processing mode, such as a single-lens reflex blurring mode or clear blurring mode.

The depth value of each pixel point in the depth image may be adjusted according to the focus data to generate an adjusted original depth image for the original photographed image. For example, the depth value of the pixel point which is greater than the depth value corresponding to the focus data is adjusted to a larger depth value, and the depth value of the pixel point which is not greater than the depth value corresponding to the focus data is adjusted to a smaller depth value, so as to highlight the depth of field effect.

According to an optional implementation, at S220, an adjustment processing value of a first pixel point of the depth image is set to a difference between a depth value of the first pixel point and a depth value of a focus point corresponding to the focus data, and an adjustment processing value of a second pixel point of the depth image is set to 0, where the depth value of the first pixel point is greater than the depth value of the focus point, and the depth value of the second pixel point is less than the depth value of the focus point. The depth value of the pixel (x, y) in the depth image is represented by $D(x, y)$, the depth value of the focus point is represented by $D$, and the adjustment processing value is represented by $P(x, y)$. According to the foregoing adjustment processing method, $P(x, y)=\max(D(x, y)-D, 0)$.

That is to say, compared with the focus point corresponding to the focus data, and with reference to the photographing point or the photographing plane, the adjustment processing value of the pixel point located behind the focus point is set to a difference between the depth value of the pixel point and the depth value of the focus point, and the adjustment processing values of the pixel points located at the focus point and in front of the focus point are set to 0. By means of such adjustment processing, after the blurring processing, the image areas located at and in front of the focus point are clear, so that the image area located behind the focus point is blurred, the farther away, the more blurred, thereby realizing such a clear blurring mode.

According to another optional implementation, at S220, the adjustment processing value of each pixel point is set as an absolute difference value between the depth value of the pixel point and the depth value of a focus point corresponding to the focus data. Similarly, the depth value of the pixel (x, y) in the depth image is represented as $D(x, y)$, the depth value of the focus point is represented as $D$, and the adjustment processing value is represented as $P(x, y)$. According to the foregoing adjustment processing method, $P(x, y)=|D(x, y)-D|$.

That is to say, compared with the focus point corresponding to the focus data, and with reference to the photographing point or the photographing plane, the adjustment processing values of the pixel point located in front of the focus point and the pixel point located behind the focus point are set as an absolute value of a difference between the depth value of the pixel point and the depth value of the focus point, and the adjustment processing value of the pixel point located at the focus point is set to 0. By means of such adjustment processing, after the blurring processing, the image areas located in front of and behind the focus point are blurred, and the farther away from the focus point, the more blurred, thereby simulating the photographing effect of the single-lens reflex camera, and realizing the single-lens reflex blurring mode.

At S230, the blurring degree data of each pixel point of the at least one pixel point is obtained according to the blurring intensity data and the adjusted original depth value of the pixel point.

Here, the blurring intensity data is parameter data representing the desired blurring intensity effect. The stronger the blurring intensity is, the more significant the overall blurring degree for the image is. The weaker the blurring intensity is, the less significant the overall blurring degree for the image is. Generally, the blurring intensity is an overall setting parameter for the image, which may be a numerical value expressed as a percentage (for example, 0-100%), or may be a discrete intensity level value, such as 1, 2, 3, 4, and 5, where 1 corresponds to a weaker intensity, and 5 corresponds to a stronger intensity.

The blurring intensity data may be set by default, or the blurring intensity data input or selected by the user may be obtained by means of a blurring processing setting interface. The blurring intensity data may be applied to the adjusted original depth image of the at least one pixel point, and the blurring degree data of each pixel point may be obtained.

S240 corresponding to the foregoing S130 may include any one of the following S240A, S240B, and S240C to perform blurring processing on the original photographed image in different manners.

At S240A, the blurring radius data of at least one pixel point is used as a parameter value of a Gaussian kernel function, and blurring processing is performed on at least one pixel point of the original photographed image by using a Gaussian blur method to generate a post-processing result image.

According to the Gaussian blur-based image blurring method, the pixel value of the pixel point is adjusted by collecting statistics about pixel values of the peripheral pixels of the pixel point and performing weighted average on the pixel values, thereby realizing the image smoothing effect. The blurring degree data of each of the foregoing pixel points may be used as a width function of the Gaussian kernel function in the Gaussian blur method to control the radial range for blurring each pixel point, and each pixel point of the original photographed image is blurred to generate a post-processing result image.

At S240B, an average kernel width of each of the at least one pixel point is determined according to the blurring radius data of the at least one pixel point, and blurring processing is performed on the at least one pixel point of the original photographed image by using an average blur method to generate a post-processing result image.

When the blurring processing is performed using the average blur method, the blurring degree data (such as the blurring radius value) of each pixel point may be determined as, for example, a predetermined proportion of the respective average kernel width of each pixel point such as a half and ⅔, to determine a value of a respective average kernel width for each pixel point, and then blurring process is performed on each pixel point according to the determined value of the average kernel width to generate a post-processing result image.

At S240C, the blurring radius data of at least one pixel point is used as a circle radius value, and blurring processing is performed on at least one pixel point of the original photographed image by using a circular blur method to generate a post-processing result image.

Similarly, when the blurring processing is performed using the circular blur method, the blurring degree data of each pixel point is determined as a corresponding circle radius value thereof, and blurring processing is performed on each pixel point to generate a post-processing result image.

At S250, the post-processing result image is displayed, and/or the post-processing result image is stored.

Specifically, the post-processing result image may be displayed, so that the user views a preview effect of the post-processing result image to determine whether the post-processing result image reaches a desired effect. On the other hand, the post-processing result image may be directly stored in the image library or at a position specified by the user, or after the user confirms that the post-processing result image reaches the desired effect, the post-processing result image is stored.

According to the image processing method provided by the foregoing embodiments, for the previously photographed image in the image library, the blurring degree data may be obtained for at least one pixel point in the original photographed image according to the re-determined focus data, the blurring intensity data, and the depth information corresponding to the original photographed image, and then blurring processing is performed on the pixel point in the original photographed image using different blurring processing methods according to the obtained blurring degree data to generate post-processing result images having different blurring effects, so that the post-processing result image having a desired effect may be obtained by processing the original photographed image.

Figure 3:
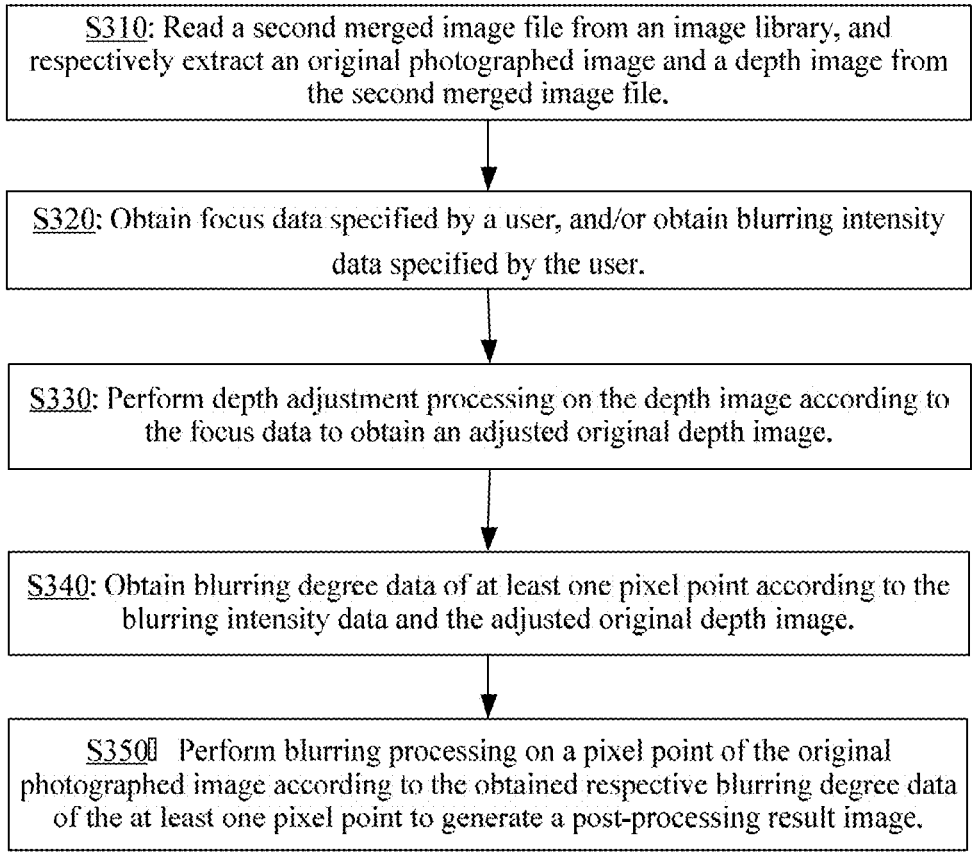
FIG. 3 is a flowchart illustrating an image processing method according to embodiments of the present disclosure.

FIG. 3 is a flowchart illustrating an image processing method according to embodiments of the present disclosure.

When the original photographed image is photographed, an image may be obtained by photographing according to a photographing setting (such as the focus point) and the photographing parameters of a photographing device and performing effect processing (such as blurring and beauty processing), i.e., an image photographed and selected to be saved by the user, and here, the image obtained by the effect processing during photographing is referred to as the original photographed effect image.

According to this embodiment, the foregoing original photographed image, the corresponding depth image, and the original photographed effect image are associatively stored in the image library. Similarly, according to an optional implementation, the original photographed image, the corresponding depth image, and the original photographed effect image are associatively stored in the image library as separate image files, respectively. Accordingly, the user can individually view any of the original photographed image, the corresponding depth image, and the original photographed effect image.

According to another optional implementation, the original photographed image, the depth image, and the original photographed effect image are stored in a second merged image file. Accordingly, when browsing the image library, the user sees the second merged image file containing the original photographed image, the depth image, and the original photographed effect image. If any of the original photographed image, the depth image, and the original photographed effect image is to be fetched separately, the desired image needs to be photographed from the second merged image file.

Figure 4:
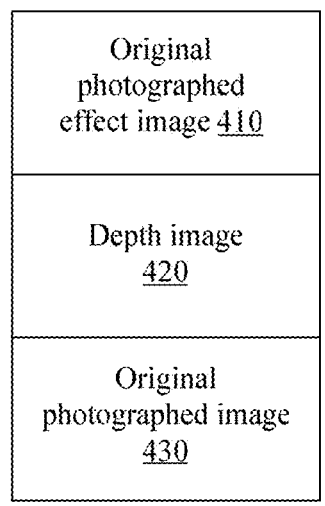
FIG. 4 illustrates an exemplary structure of a merged image according to embodiments of the present disclosure.

The original photographed image, the depth image, and the original photographed effect image are written in a random sequence according to requirements. In some examples, the original photographed image and the depth image are written behind the original photographed effect image, or the depth image and the original photographed effect image are written behind the original photographed image, so as to view the first written original photographed effect image or the original photographed image. FIG. 4 illustrates an exemplary structure of a merged image according to embodiments of the present disclosure. Referring to FIG. 4, an original photographed effect image 410, a depth image 420, and an original photographed image 430 are sequentially written in the merged image 400.

When the user wants to view the original photographed effect image 410, only the original photographed effect image 410 may be read from the merged image 400, and is displayed to the user. In this case, the user does not know the existent of the depth image 420 and the original photographed image 430.

In order to separately fetch any of the original photographed image, the depth image, and the original photographed effect image from the second merged image file, it is necessary to record information of the position and/or length of each image in the second merged image file. With this regard, in some examples, a file header of the second merged image file includes information indicating a length of the original photographed effect image and/or the original photographed image.

The processing of the image processing method of the embodiments is described below with reference to FIG. 3.

At S310, the second merged image file is read from the image library, and the original photographed image and the depth image are respectively extracted from the second merged image file.

For example, the second merged image file is read from the image library according to an interactive operation of the user, and the original photographed image and the depth image are respectively extracted from the second merged image file according to the information, indicating a length of the original photographed effect image and/or the original photographed image, in the file header of the second merged image file.

At S320, the focus data specified by a user is obtained; and/or the blurring intensity data specified by the user is obtained.

According to this embodiment, the focus data and/or the blurring intensity data is obtained, for example, by means of user interactive interface or by means of program interaction, so as to dynamically set the focus data and/or the blurring intensity data. For example, an image area clicked by the user on the displayed original photographed effect image is determined as the focus area. For another example, a scale interaction item for selecting the blurring intensity or an input box for inputting the blurring intensity percentage may be set to obtain the blurring intensity data.

At S330, adjustment processing is performed on the depth image according to the focus data to obtain an adjusted original depth image.

At S340, blurring degree data of at least one pixel point is obtained according to the blurring intensity data and the adjusted original depth image.

The processing of S330 and S340 is executed with reference to the foregoing S220 and S230.

At S350, blurring processing is performed on a pixel point of the original photographed image according to the obtained respective blurring degree data of the at least one pixel point to generate a post-processing result image.

The processing of S350 is executed with reference to the foregoing S240A, S240B, or S240C.

After the post-processing result image is obtained by means of S240 or S350, more effect processing may be further performed on the post-processing result image, such as nonlinear mapping processing.

According to this embodiment, the original photographed image and the depth image may be obtained from the second merged image file stored in the image library, and the re-determined focus data and/or blurring intensity data is obtained, so as to obtain blurring degree data for at least one pixel point in the original photographed image by means of the dynamically set focus data and/or blurring intensity data, and blurring process is then performed on the pixel point of the original photographed image by using different blurring processing methods to generate post-processing result images having different blurring effects, so as to make up for the deficiencies in the blurring effect due to the calculation error of the blurring processing during photographing.

Figure 5:
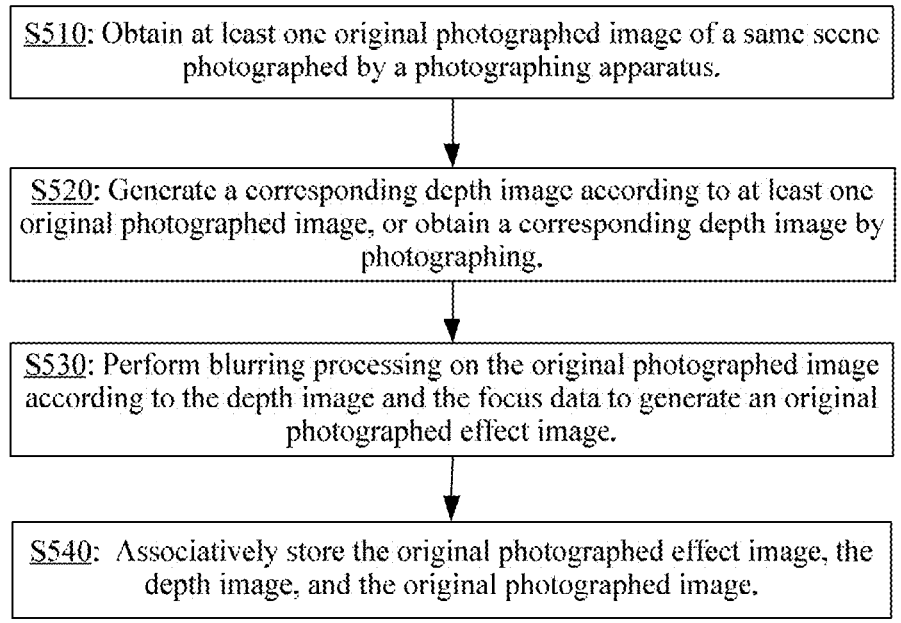
FIG. 5 is a flowchart illustrating an image photographing method according to embodiments of the present disclosure.

FIG. 5 is a flowchart illustrating an image photographing method according to embodiments of the present disclosure.

Referring to FIG. 5, at S510, at least one original photographed image of a same scene photographed by a photographing apparatus is obtained.

For example, multiple original photographed images of a same scene are photographed by means of a multi-lens module, or at least one original photographed image is photographed by a single camera module for photographing a left eye image and a right eye image.

At S520, a corresponding depth image is generated according to at least one original photographed image, or a corresponding depth image is obtained by photographing.

A corresponding depth image may be generated for at least one original photographed image by means of any suitable depth calculation method or a pre-trained neural network model. Alternatively, the same scene may be photographed from the same position and at the same angle using a photographing device or a sensor to obtain a depth image of at least one pixel point.

At S530, blurring processing is performed on the original photographed image according to the depth image and the focus data to generate an original photographed effect image.

The focus data may be, for example, a default focus point, or for example, a focus area clicked by the user.

The processing of S530 is executed according to any suitable image blurring processing method.

At S540, the original photographed effect image, the depth image, and the original photographed image are associatively stored.

As stated above, according to an optional implementation of the present disclosure, the original photographed effect image, the original photographed image, and the corresponding depth image are stored in an associated image file in the image library. According to another optional implementation of the present disclosure, the original photographed image, the depth image, and the original photographed effect image are stored in a second merged image file, where information of the positions and/or lengths of the original photographed effect image, the depth image, and the original photographed image is recorded in the file header of the second merged image file.

In some examples, in the second merged image file, the original photographed image and the depth image are written behind the original photographed effect image.

According to this embodiment, at least one original photographed image of the same scene photographed by the photographing apparatus is obtained, a depth image corresponding to the original photographed image is obtained, and the original photographed effect image, the depth image, and the original photographed image are associatively stored. Thereby, it is helpful to execute any of the image processing methods in the foregoing embodiments.

Figure 6:
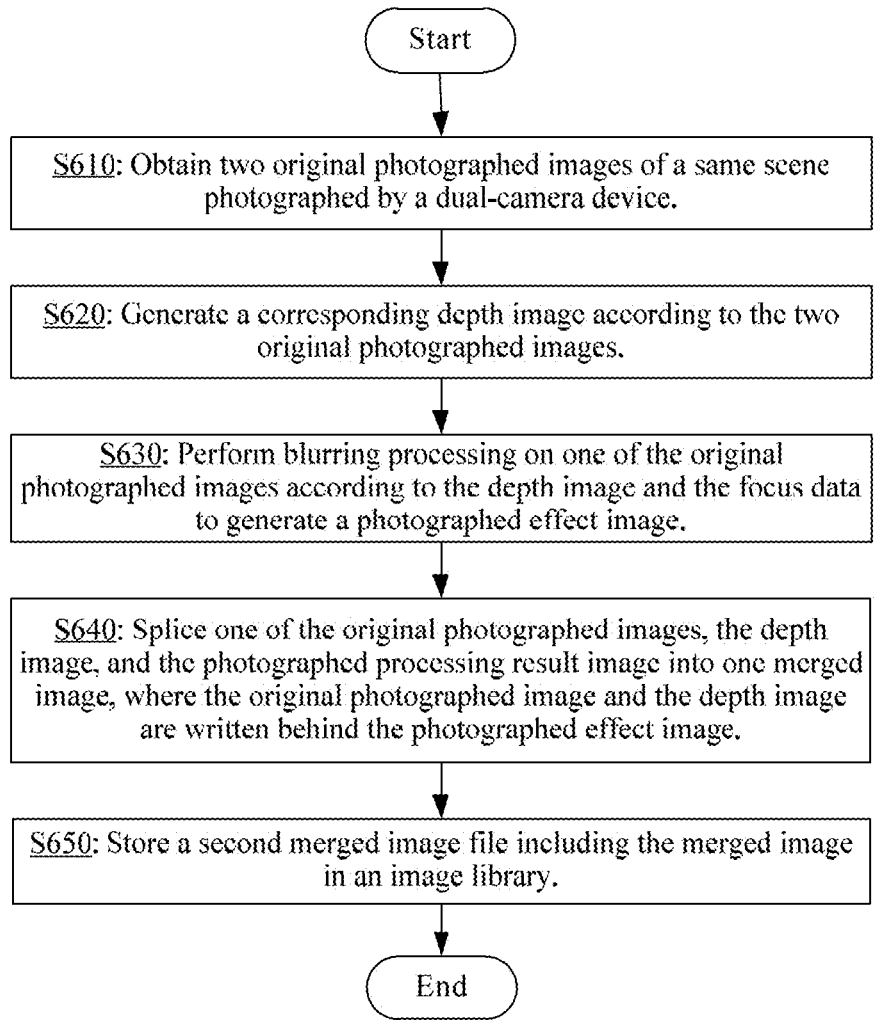
FIG. 6 is a flowchart illustrating an image photographing method according to embodiments of the present disclosure.

FIG. 6 is a flowchart illustrating an image photographing method according to embodiments of the present disclosure.

Referring to FIG. 6, at S610, two original photographed images of a same scene photographed by a dual-camera device are obtained.

At S620, a corresponding depth image is generated according to the two original photographed images.

At S630, blurring processing is performed on one of the original photographed images according to the depth image and the focus data to generate a photographed effect image.

At S640, one of the original photographed images, the depth image, and the photographed processing result image are spliced into one merged image, where the original photographed image and the depth image are written behind the photographed effect image.

At S650, a second merged image file including the merged image is stored in the image library.

Thereby, the processing of the image photographing method of this embodiment is completed.

Figure 7:
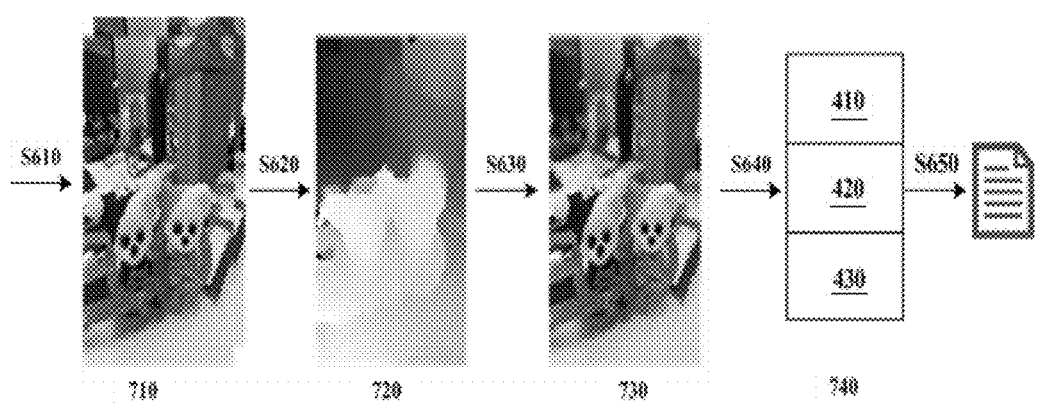
FIG. 7 is a flowchart illustrating an image photographing method according to embodiments of the present disclosure.

FIG. 7 illustrates exemplary processing of an image photographing method according to embodiments of the present disclosure. Two original photographed images 710 of the same scene are obtained by means of the processing of S610. A depth image 720 is generated by means of the processing of S620. A photographed effect image 730 is generated by means of the processing of S630. A merged image 740 is obtained by means of the processing of S640. Thereafter, at S650, a second merged image file including the merged image 740 is stored in the image library.

On this basis, in order to facilitate the user to view the images in the image library, in some examples, in response to an image display command, the second merged image file is read from the image library, and the original photographed effect image is extracted according to a size of the original photographed effect image, and the original photographed effect image is displayed. In this case, the user may view only the original photographed effect image, and/or, the user may reset the blurring effect according to the displayed original photographed effect image, for example, resetting the focus area, or resetting the blurring intensity and the blurring aperture value, etc., and the processing according to any of the foregoing embodiments is continued to obtain a new post-processing effect image.

In the process of using a camera (including a camera in a mobile phone) to photograph, parameter adjustments (such as a focus point) for the camera can greatly affect the quality of the pictures. However, when taking pictures, non-professional users generally cannot adjust the parameters well to achieve the desired photographing results. Therefore, technologies that use the dual camera of the mobile phone to calculate the depth of a photo, automatically adjust the parameters, blur the background of the photo, and highlight the main object, is developed, so that ordinary users can also simply take a photo that simulates the large aperture blurring effect of the single-lens reflex camera, which is referred to as a blurring technology.

However, the blurring technology still cannot fully meet the needs of the common users. On one hand, automatically calculating the depth or parameters of the photo may cause errors (for example, the focus point is mistakenly set on a background character instead of a foreground character), causing that the blurring result does not meet the user's expectations. On the other hand, some rare scenes are as a flash in the pan, which are difficult to meet again, and the user hopes to complete multiple blurring effects in a photo, which is also impossible, because the existing technology can only produce one blurring photo according to the parameters set during photographing. The embodiments provided by the present disclosure will solve the following problems: first, when the blurring technology is used for photographing, the blurring effect cannot be further adjusted by adjusting parameters after the photograph is generated; and second, when the blurring technology is used for photographing, only a photo with one blurring effect may be produced for one photographing.

In the following embodiments, the differences between the embodiments of the present disclosure and related technologies include that 1) in the following embodiments, the original photographed image obtained by the dual camera and the calculated depth image are stored, while in the related technologies, the original photographed image and the depth image are discarded after being processed by the blurring technology; 2) in the following embodiments, the original photographed image and the depth image stored during photographing are used during blurring and may be completely separated from the photographing process, while in the related technology, blurring processing is only performed at the same time of photographing; and 3) in the following embodiments, multiple images of different blurring effects may be generated from one original photographed image according to user requirements, while in the related technologies, only one picture of the blurring effect is generated from a single original photographed image.

By means of the above differences, in the embodiments provided by the present disclosure, the blurring effect of the picture can still be adjusted at any time after photographing, for example, adjusting the blurring intensity so that the background is more blurred, and the subject is more prominent, and can also generate multiple pictures with different blurring effects from a same original photographed image. For example, referring to FIG. 7, for a picture of a little girl holding a puppy, a focus point may be generated on the little girl, and the images of the puppy and the background are blurred, so as to highlight the innocence face of the little girl. A focus point can also be generated on the puppy, and the images of the little girl and the background are blurred, so as to highlight the softness of the puppy's hair. A focus point can also be generated on the puppy and the little girl, and only the background is blurred, so as to display the harmonious playing scene of the little girl and the puppy.

Figure 9A:
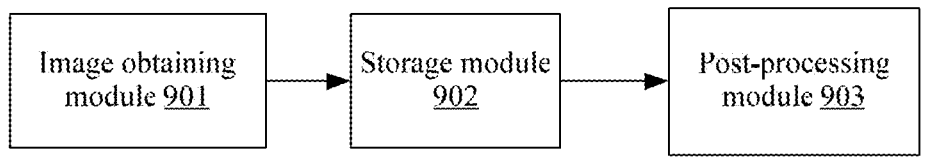
FIG. 9A is a logic block diagram illustrating an image processing apparatus according to embodiments of the present disclosure.

FIG. 9A is a logic block diagram illustrating an image processing apparatus according to embodiments of the present disclosure. Referring to FIG. 9A, an image processing apparatus according to the embodiment of the present disclosure includes: an image obtaining module 901 configured to obtain an original photographed image and a depth image corresponding to the original photographed image; a storage module 902 configured to store the original photographed image and the depth image; and a post-processing module 903 configured to perform blurring processing on the original photographed image by using the depth image stored in the storage module 902 to generate a post-processing result image.

In some examples, the depth image includes original depth information of at least one pixel point in the original photographed image. The post-processing module includes:

a blurring degree determining module configured to determine blurring degree data of each of at least one pixel point in the original photographed image according to blurring parameter data and the original depth information of the at least one pixel point; and a blurring processing module configured to perform blurring processing on the original photographed image according to the blurring degree data of the at least one pixel point to generate a post-processing result image.

In some examples, the blurring parameter data includes focus data and blurring intensity data. The blurring degree determining module includes:

a depth adjusting unit configured to perform, according to the focus data, adjustment processing on an original depth value corresponding to the original depth information of the at least one pixel point to obtain an adjusted depth value of each of the at least one pixel point; and a blurring degree obtaining unit configured to obtain the blurring degree data of each pixel point according to the blurring intensity data and the adjusted depth value of the pixel point.

In some examples, the depth adjusting unit includes:

a first depth adjusting subunit configured to set an adjusted depth value of a first pixel point of the at least one pixel point to a difference between an original depth value of the first pixel point and a depth value of a focus point corresponding to the focus data, and set an adjusted depth value of a second pixel point of the at least one pixel point to 0, where the original depth value of the first pixel point is greater than the depth value of the focus point, and the original depth value of the second pixel point is less than the depth value of the focus point.

In some examples, the depth adjusting unit includes:

a second depth adjusting subunit configured to set the adjusted depth value of each pixel point as an absolute difference value between an original depth value of the pixel point and a depth value of a focus point corresponding to the focus data.

In some examples, the blurring degree data includes blurring radius data. The blurring processing module includes: a first blurring processing unit configured to use the blurring radius data of the at least one pixel point as a parameter value of a Gaussian kernel function, and perform blurring processing on the at least one pixel point of the original photographed image by using a Gaussian blur method to generate a post-processing result image; or a second blurring processing unit configured to determine an average kernel width of each of the at least one pixel point according to the blurring radius data of the at least one pixel point, and perform blurring processing on the at least one pixel point of the original photographed image by using an average blur method to generate a post-processing result image; or a third blurring processing unit configured to use the blurring radius data of the at least one pixel point as a circle radius value, and perform blurring processing on the at least one pixel point of the original photographed image by using a circular blur method to generate a post-processing result image.

In some examples, the apparatus further includes:

a post-processing result image display module configured to display the post-processing result image; and/or a post-processing result image storage module configured to store the post-processing result image.

In some example, before the depth adjusting unit performs, according to the focus data, adjustment processing on an original depth value corresponding to the original depth information of the at least one pixel point to obtain an adjusted depth value of each of the at least one pixel point, the blurring degree determining module further includes: a focus data obtaining unit configured to obtain the focus data specified by a user; and/or a blurring intensity obtaining unit configured to obtain the blurring intensity data specified by the user.

In some examples, the storage module is configured to associatively store the original photographed image and the depth image in an image library.

In some examples, the storage module is configured to associatively store the original photographed image and the depth image in the image library as separate image files; or store the original photographed image and the depth image in a first merged image file of the image library.

In some examples, the storage module is configured to associatively store the original photographed image, the depth image, and an original photographed effect image in the image library as separate image files.

In some examples, the storage module is configured to store the original photographed image, the depth image, and the original photographed effect image in a second merged image file.

In some examples, the storage module is configured to write the original photographed image and the depth image behind the original photographed effect image.

In some examples, a file header of the second merged image file includes information indicating a length of the original photographed effect image and/or the original photographed image.

In some examples, the original photographed effect display module is configured to: in response to an image display command, extract the original photographed effect image from the second merged image file according to a size of the original photographed effect image, and display the original photographed effect image.

Figure 9B:
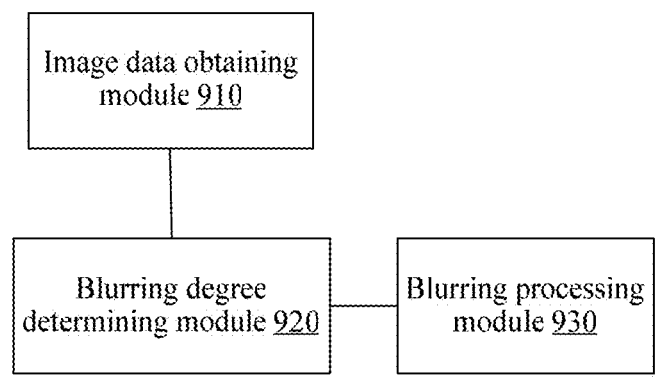
FIG. 9B is a logic block diagram illustrating an image processing apparatus according to embodiments of the present disclosure.

FIG. 9B is a logic block diagram illustrating an image processing apparatus according to embodiments of the present disclosure. Referring to FIG. 9B, an image processing apparatus according to the embodiment of the present disclosure includes an image data obtaining module 910, a blurring degree determining module 920, and a blurring processing module 930.

The image data obtaining module 910 is configured to obtain an original photographed image and original depth information of at least one pixel point in the original photographed image.

The blurring degree determining module 920 is configured to determine blurring degree data of each of at least one pixel point in the original photographed image according to blurring parameter data and the original depth information of the at least one pixel point obtained by the image data obtaining module 910.

The blurring processing module 930 is configured to perform blurring processing on the original photographed image according to the blurring degree data of the at least one pixel point determined by the blurring degree determining module 920 to generate a post-processing result image.

In this case, a post-processing result image having a blurring effect corresponding to, for example, the re-determined focus data or the blurring aperture value may be generated for the original image photographed at a certain occasion, so as to make up for the deficiencies in the blurring effect due to the calculation error of the blurring processing during photographing. In addition, the post-processing result image having different blurring effects may be repeatedly generated by the foregoing method.

The image processing apparatus of this embodiment is configured to realize the corresponding image processing method in the foregoing method embodiments, and has the beneficial effect of the corresponding method embodiments. Details are not described herein again.

Figure 10:
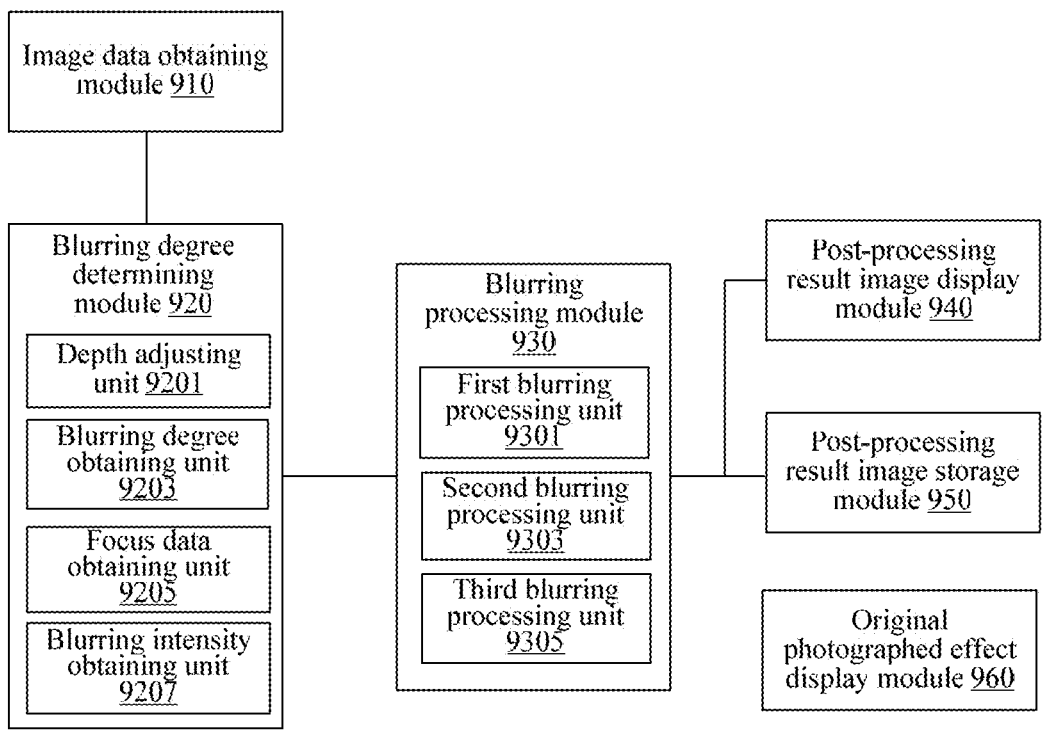
FIG. 10 is a logic block diagram illustrating an image processing apparatus according to embodiments of the present disclosure.

FIG. 10 is a logic block diagram illustrating an image processing apparatus according to embodiments of the present disclosure. According to the embodiment of the present disclosure, the blurring parameter data may include, but not limited to, focus data, blurring intensity data, etc.

Accordingly, the blurring degree determining module 920 includes: a depth adjusting unit 9201 configured to perform, according to the focus data, adjustment processing on an original depth value corresponding to the original depth information of the at least one pixel point to obtain an adjusted depth value of each of the at least one pixel point; and a blurring degree obtaining unit 9203 configured to obtain the blurring degree data of each pixel point according to the blurring intensity data and the adjusted depth value of the pixel point.

In some optional implementations, the depth adjusting unit 9201 includes a first depth adjusting subunit (not shown) configured to set an adjusted depth value of a first pixel point of the at least one pixel point to a difference between an original depth value of the first pixel point and a depth value of a focus point corresponding to the focus data, and set an adjusted depth value of a second pixel point of the at least one pixel point to 0, where the original depth value of the first pixel point is greater than the depth value of the focus point, and the original depth value of the second pixel point is less than the depth value of the focus point.

According to another optional implementation of the present disclosure, the depth adjusting unit 9201 includes a second depth adjusting subunit (not shown) configured to set the adjusted depth value of each pixel point as an absolute difference value between an original depth value of the pixel point and a depth value of a focus point corresponding to the focus data.

In some examples, the blurring degree data includes blurring radius data. Accordingly, the blurring processing module 930 includes: a first blurring processing unit 9301 configured to use the blurring radius data of the at least one pixel point as a parameter value of a Gaussian kernel function, and perform blurring processing on the at least one pixel point of the original photographed image by using a Gaussian blur method to generate a post-processing result image; or a second blurring processing unit 9303 configured to determine an average kernel width of each of the at least one pixel point according to the blurring radius data of the at least one pixel point, and perform blurring processing on the at least one pixel point of the original photographed image by using an average blur method to generate a post-processing result image; or a third blurring processing unit 9305 configured to use the blurring radius data of the at least one pixel point as a circle radius value, and perform blurring processing on the at least one pixel point of the original photographed image by using a circular blur method to generate a post-processing result image.

In some examples, the apparatus further includes: a post-processing result image display module 940 configured to display the post-processing result image; and/or a post-processing result image storage module 950 configured to store the post-processing result image.

In some examples, before the depth adjusting unit 9201 performs, according to the focus data, adjustment processing on an original depth value corresponding to the original depth information of the at least one pixel point to obtain an adjusted depth value of each of the at least one pixel point, the blurring degree determining module 920 further includes: a focus data obtaining unit 9205 configured to obtain the focus data specified by a user; and/or a blurring intensity obtaining unit 9207 configured to obtain the blurring intensity data specified by the user.

In some examples, the image data obtaining module 910 is configured to obtain the stored original photographed image and a corresponding depth image, the depth image including original depth information of the at least one pixel point.

According to an optional implementation of the present disclosure, the original photographed image and the depth image are associatively stored in an image library.

In some examples, the original photographed image and the depth image are associatively stored in the image library as separate image files, respectively; or the original photographed image and the depth image are stored in a first merged image file of the image library.

In some examples, the original photographed image, the depth image, and an original photographed effect image are associatively stored in the image library as separate image files, respectively.

According to another optional implementation of the present disclosure, the original photographed image, the depth image, and the original photographed effect image are stored in a second merged image file. Accordingly, the image data obtaining module 910 is configured to read the second merged image file from the image library, and respectively extract the original photographed image and the depth image from the second merged image file.

In some examples, the original photographed image and the depth image are written behind the original photographed effect image.

In some examples, a file header of the second merged image file includes information indicating a length of the original photographed effect image and/or the original photographed image.

In some example, the apparatus further includes: an original photographed effect display module 960 configured to: in response to an image display command, read the second merged image file from the image library, extract the original photographed effect image according to a size of the original photographed effect image, and display the original photographed effect image.

The image processing apparatus of this embodiment is configured to realize the corresponding image processing method in the foregoing method embodiments, and has the beneficial effect of the corresponding method embodiments. Details are not described herein again.

The embodiments of the present disclosure provide a computer readable storage medium having a computer program instruction stored thereon, where the program instruction is executed by a processor to realize steps of the image processing method according to the foregoing embodiments, and has the beneficial effect of the corresponding embodiments. Details are not described herein again.

The embodiments of the present disclosure further provide a computer program, including a computer program instruction, where the program instruction is executed by a processor to realize steps of the image processing method according to the foregoing embodiments, and has the beneficial effect of the corresponding embodiments. Details are not described herein again.

Figure 11:
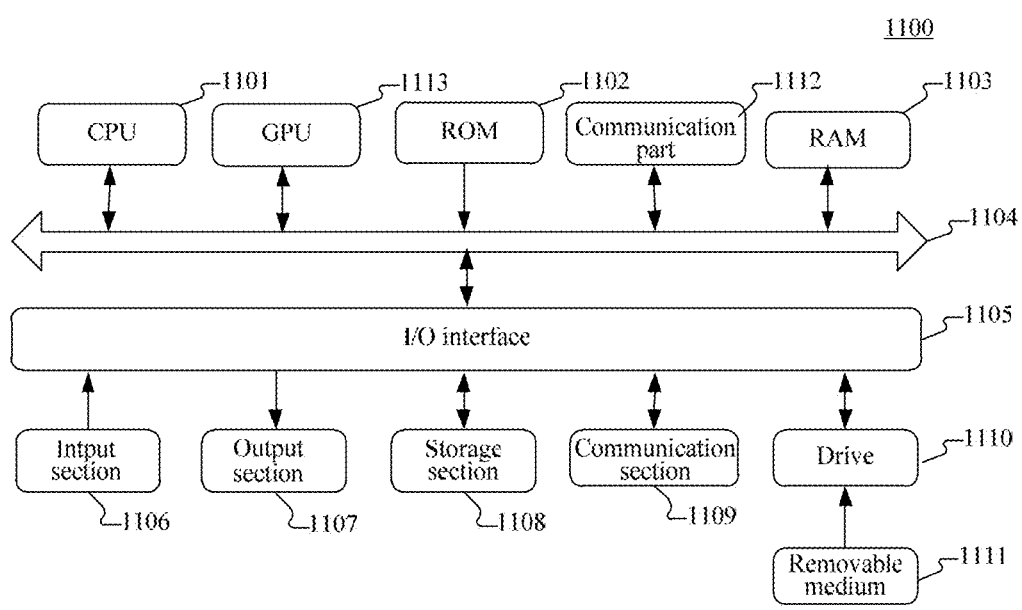
FIG. 11 is a schematic structural diagram of an electronic device according to embodiments of the present disclosure.

FIG. 11 is a schematic structural diagram of an electronic device according to embodiments of the present disclosure. The embodiments of the present disclosure provide an electronic device which, for example, may be a mobile terminal, a Personal Computer (PC), a tablet computer, a server, and the like. Referring to FIG. 11 below, a schematic structural diagram of an electronic device 1100, which may be a terminal device or a server, suitable for implementing the embodiment of the present disclosure is shown. As shown in FIG. 11, the computer system 1100 includes one or more processors, a communication element, and the like. The one or more processors are, for example, one or more Central Processing Units (CPUs) 1101 and/or one or more Graphic Processing Units (GPUs) 1113, and may execute appropriate actions and processing according to executable instructions stored in a Read-Only Memory (ROM) 1102 or executable instructions loaded from a storage section 1108 to a Random Access Memory (RAM) 1103. The communication element includes a communication component 1112 and/or a communication interface 1109. The communication component 1112 may include, but is not limited to, a network card. The network card may include, but is not limited to, an InfiniBand (IB) network card. The communication interface 1109 includes a communication interface of a network interface card such as an LAN card and a modem, and the communication interface 1109 performs communication processing via a network such as the Internet.

The processor may be communicated with the ROM 1102 and/or the RAM 1103 to execute the executable instructions and is connected to a communication component 1112 by means of a bus 1104 and communicated with other target devices by means of the communication component 1112, so as to implement the operations corresponding to any of the methods provided by the embodiments of the present disclosure, for example: obtaining an original photographed image and original depth information of at least one pixel point in the original photographed image; determining blurring degree data of each of at least one pixel point in the original photographed image according to blurring parameter data and the original depth information of the at least one pixel point; and performing blurring processing on the original photographed image according to the blurring degree data of the at least one pixel point to generate a post-processing result image.

In addition, the RAM 1103 further stores various programs and data required for operations of an apparatus. The CPU 1101, the ROM 1102, and the RAM 1103 are connected to each other via the bus 1104. In the case that the RAM 1103 exists, the ROM 1102 is an optional module. The RAM 1103 stores executable instructions, or writes the executable instructions to the ROM 1102 during running, where the executable instructions enable the processor 1101 to perform corresponding operations of the foregoing communication method. An Input/Output (I/O) interface 1105 is also connected to the communication bus 1104. The communication component 1112 may be integrated, or may be configured to have multiple sub-modules (for example, multiple IB network cards) linked on the communication bus.

The following components are connected to the I/O interface 1105: an input section 1106 including a keyboard, a mouse and the like; an output section 1107 including a Cathode-Ray Tube (CRT), a Liquid Crystal Display (LCD), a loudspeaker and the like; a storage section 1108 including hardware and the like; and the communication interface 1109 of a network interface card including an LAN card, a modem and the like. A drive 1110 is also connected to the I/O interface 1105 according to requirements. A removable medium 1111 such as a magnetic disk, an optical disk, a magneto-optical disk, a semiconductor memory or the like is mounted on the drive 1110 according to requirements, so that a computer program read from the removable medium is installed on the storage section 1108 according to requirements.

It should be noted that the architecture illustrated in FIG. 11 is merely an optional implementation mode. During specific practice, the number and types of the components in FIG. 11 may be selected, decreased, increased, or replaced according to actual requirements. Different functional components may be separated or integrated or the like. For example, the GPU and the CPU may be separated, or the GPU may be integrated on the CPU, and the communication element 1112 may be separated from or integrated on the CPU or the GPU or the like. These alternative implementations all fall within the scope of protection of the present disclosure.

Particularly, according to the embodiments of the present disclosure, the process described above with reference to the flowchart may be implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the steps of the methods provided by the embodiments of the present disclosure, for example, an executable code for obtaining an original photographed image and original depth information of at least one pixel point in the original photographed image; an executable code for determining blurring degree data of each of at least one pixel point in the original photographed image according to the blurring parameter data and the original depth information of the at least one pixel point; and an executable code for performing blurring processing on the original photographed image according to the blurring degree data of the at least one pixel point to generate a post-processing result image. In such embodiments, the computer program may be downloaded from a network by means of the communication element and installed, and/or be installed from the removable medium 1111. When the computer program is executed by the CPU 1101, functions provided in the method according to the embodiments of the present disclosure are executed.

According to the electronic device provided by the embodiments of the present disclosure, for the previously photographed image (the original photographed image), the blurring degree data may be obtained for at least one pixel point in the original photographed image according to the re-determined blurring parameter and the depth information generated for the original photographed image, and then blurring processing is performed on each corresponding pixel point in the original photographed image according to the obtained blurring degree data to generate a post-processing result image. In this case, a post-processing result image having a blurring effect corresponding to, for example, the re-determined focus data or the blurring aperture value may be generated for the original image photographed at a certain occasion, so as to make up for the deficiencies in the blurring effect due to the calculation error of the blurring processing during photographing. In addition, the post-processing result image having different blurring effects may be repeatedly generated by the foregoing method.

It should be noted that according to needs for implementation, the components/steps described in the present disclosure are separated into more components/steps, and two or more components/steps or some operations of the components/steps are also combined into new components/steps.

In one or more optional implementations, the embodiments of the present disclosure also provide a computer program product configured to store computer-readable instructions, where when the instructions are executed, a computer executes the image processing method in any of the foregoing embodiments. The computer program product is implemented by means of hardware, software, or a combination thereof. In an optional example, the computer program product is specifically embodied in a computer storage medium. In another example, the computer program product is specifically embodied in a software product, such as a Software Development Kit (SDK).

In one or more optional implementations, the embodiments of the present disclosure further provide another image processing method and an apparatus corresponding thereto, an electronic device, a computer storage medium, a computer program, and a computer program product. The method includes: sending, by a first apparatus, an image processing indication to a second apparatus, where the indication causes the second apparatus to execute the image processing method according to any one of the possible embodiments; and receiving, by the first apparatus, a post-processing result image sent by the second apparatus.

In some embodiments, the image processing indication is specifically an invoking instruction. The first apparatus instructs, by means of invoking, the second apparatus to execute image processing. Accordingly, in response to receiving the invoking instruction, the second apparatus executes the steps and/process in any one of the embodiments of the image processing method.

It should be understood that the terms such as "first" and "second" in the embodiments of the present disclosure are only used for distinguishing, and shall not be understood as limitations on the embodiments of the present disclosure. It should also be understood that, the descriptions of the embodiments in the present disclosure focus on differences between the embodiments, and for same or similar parts in the embodiments, refer to these embodiments. For the purpose of brevity, details are not described again.

The methods, apparatuses, and devices in the present disclosure are implemented in many manners. For example, the methods, apparatuses, and devices in the embodiments of the present disclosure are implemented with software, hardware, firmware, or any combination of software, hardware, and firmware. Unless otherwise specially stated, the foregoing sequences of steps of the methods are merely for description, and are not intended to limit the steps of the methods in the embodiments of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. An image processing method, comprising:
  obtaining an original photographed image and a depth image corresponding to the original photographed image;
  storing the original photographed image and the depth image; and
  performing blurring processing on the original photographed image by using the stored depth image to generate a post-processing result image,
  wherein the depth image comprises original depth information of at least one pixel point in the original photographed image; and the performing blurring processing on the original photographed image by using the depth image to generate a post-processing result image comprises:
  determining blurring degree data of each of the at least one pixel point in the original photographed image according to blurring parameter data and the original depth information of the at least one pixel point; and
  performing blurring processing on the original photographed image according to the blurring degree data of the at least one pixel point to generate a post-processing result image,
  wherein the blurring parameter data comprises focus data and blurring intensity data; and the determining blurring degree data of each of the at least one pixel point in the original photographed image according to blurring parameter data and the original depth information of the at least one pixel point comprises:
  performing, according to the focus data, adjustment processing on an original depth value corresponding to the original depth information of the at least one pixel point to obtain an adjusted depth value of each of the at least one pixel point; and
  obtaining the blurring degree data of each pixel point according to the blurring intensity data and the adjusted depth value of the pixel point,
  wherein the performing, according to the focus data, adjustment processing on an original depth value corresponding to the original depth information of the at least one pixel point to obtain an adjusted depth value of each of the at least one pixel point comprises:
  setting an adjusted depth value of a first pixel point of the at least one pixel point to a difference between an original depth value of the first pixel point and a depth value of a focus point corresponding to the focus data, and setting an adjusted depth value of a second pixel point of the at least one pixel point to 0, wherein the original depth value of the first pixel point is greater than the depth value of the focus point, and the original depth value of the second pixel point is less than the depth value of the focus point.

2. The method according to claim 1, wherein the performing, according to the focus data, adjustment processing on an original depth value corresponding to the original depth information of the at least one pixel point to obtain an adjusted depth value of each of the at least one pixel point comprises:
  setting the adjusted depth value of each pixel point as an absolute difference value between an original depth value of the pixel point and a depth value of a focus point corresponding to the focus data.

3. The method according to claim 2, wherein the blurring degree data comprises blurring radius data; and
  the performing blurring processing on the original photographed image according to the blurring degree data of the at least one pixel point to generate a post-processing result image comprises:
  using the blurring radius data of the at least one pixel point as a parameter value of a Gaussian kernel function, and performing blurring processing on the at least one pixel point of the original photographed image by using a Gaussian blur method to generate the post-processing result image; or
  determining an average kernel width of each of the at least one pixel point according to the blurring radius data of the at least one pixel point, and performing blurring processing on the at least one pixel point of the original photographed image by using an average blur method to generate the post-processing result image; or
  using the blurring radius data of the at least one pixel point as a circle radius value, and performing blurring processing on the at least one pixel point of the original photographed image by using a circular blur method to generate the post-processing result image.

4. The method according to claim 1, further comprising at least one of:
displaying the post-processing result image, or storing the post-processing result image.

5. The method according to claim 1, wherein before performing adjustment processing on an original depth value of at least one pixel point in the original photographed image indicated by the depth image, the method further comprises at least one of:
obtaining the focus data specified by a user, or obtaining the blurring intensity data specified by the user.

6. The method according to claim 5, wherein the storing the original photographed image and the depth image comprises:
associatively storing the original photographed image and the depth image in an image library.

7. The method according to claim 6, wherein the associatively storing the original photographed image and the depth image in an image library comprises:
associatively storing the original photographed image and the depth image in the image library as separate image files; or
storing the original photographed image and the depth image in a first merged image file of the image library.

8. The method according to claim 6, wherein the storing the original photographed image and the depth image comprises:
associatively storing the original photographed image, the depth image, and an original photographed effect image in the image library as separate image files.

9. The method according to claim 6, wherein the storing the original photographed image and the depth image comprises:
storing the original photographed image, the depth image, and an original photographed effect image in a second merged image file.

10. The method according to claim 9, wherein the storing the original photographed image, the depth image, and an original photographed effect image in a second merged image file comprises:
writing the original photographed image and the depth image behind the original photographed effect image.

11. The method according to claim 9, wherein a file header of the second merged image file comprises information indicating a length of at least one of the original photographed effect image or the original photographed image.

12. The method according to claim 9, further comprising:
in response to an image display command, extracting the original photographed effect image from the second merged image file according to a size of the original photographed effect image, and displaying the original photographed effect image.

13. An image processing method, comprising:
obtaining an original photographed image and original depth information of at least one pixel point in the original photographed image;
determining blurring degree data of each of the at least one pixel point in the original photographed image according to blurring parameter data and the original depth information of the at least one pixel point; and
performing blurring processing on the original photographed image according to the blurring degree data of the at least one pixel point to generate a post-processing result image, wherein the blurring parameter data comprises focus data and blurring intensity data; and the determining blurring degree data of each of the at least one pixel point in the original photographed image according to blurring parameter data and the original depth information of the at least one pixel point comprises:
performing, according to the focus data, adjustment processing on an original depth value corresponding to the original depth information of the at least one pixel point to obtain an adjusted depth value of each of the at least one pixel point; and
obtaining the blurring degree data of each pixel point according to the blurring intensity data and the adjusted depth value of the pixel point,
wherein the performing, according to the focus data, adjustment processing on an original depth value corresponding to the original depth information of the at least one pixel point to obtain an adjusted depth value of each of the at least one pixel point comprises:
setting an adjusted depth value of a first pixel point of the at least one pixel point to a difference between an original depth value of the first pixel point and a depth value of a focus point corresponding to the focus data, and setting an adjusted depth value of a second pixel point of the at least one pixel point to 0, wherein the original depth value of the first pixel point is greater than the depth value of the focus point, and the original depth value of the second pixel point is less than the depth value of the focus point.

14. The method according to claim 13, wherein the carrying out, according to the focus data, adjustment processing on an original depth value corresponding to the original depth information of the at least one pixel point to obtain an adjusted depth value of each of the at least one pixel point comprises: setting the adjusted depth value of each pixel point as an absolute difference value between an original depth value of the pixel point and a depth value of a focus point corresponding to the focus data.

15. An image processing apparatus, comprising:
a memory storing processor-executable instructions; and
a processor, configured to execute the stored processor-executable instructions to perform operations of:
obtaining an original photographed image and a depth image corresponding to the original photographed image;
storing the original photographed image and the depth image; and
performing blurring processing on the original photographed image by using the stored depth image to generate a post-processing result image,
wherein the depth image comprises original depth information of at least one pixel point in the original photographed image; and the performing blurring processing on the original photographed image by using the depth image to generate a post-processing result image comprises:
determining blurring degree data of each of the at least one pixel point in the original photographed image according to blurring parameter data and the original depth information of the at least one pixel point; and
performing blurring processing on the original photographed image according to the blurring degree data of the at least one pixel point to generate a post-processing result image,
wherein the blurring parameter data comprises focus data and blurring intensity data; and the determining blurring degree data of each of the at least one pixel point in the original photographed image according to blurring parameter data and the original depth information of the at least one pixel point comprises:

performing, according to the focus data, adjustment processing on an original depth value corresponding to the original depth information of the at least one pixel point to obtain an adjusted depth value of each of the at least one pixel point; and obtaining the blurring degree data of each pixel point according to the blurring intensity data and the adjusted depth value of the pixel point, wherein the performing, according to the focus data, adjustment processing on an original depth value corresponding to the original depth information of the at least one pixel point to obtain an adjusted depth value of each of the at least one pixel point comprises:

setting an adjusted depth value of a first pixel point of the at least one pixel point to a difference between an original depth value of the first pixel point and a depth value of a focus point corresponding to the focus data, and setting an adjusted depth value of a second pixel point of the at least one pixel point to 0, wherein the original depth value of the first pixel point is greater than the depth value of the focus point, and the original depth value of the second pixel point is less than the depth value of the focus point.

16. The image processing apparatus of claim 15, wherein the performing, according to the focus data, adjustment processing on an original depth value corresponding to the original depth information of the at least one pixel point to obtain an adjusted depth value of each of the at least one pixel point comprises:

setting the adjusted depth value of each pixel point as an absolute difference value between an original depth value of the pixel point and a depth value of a focus point corresponding to the focus data.

17. The image processing apparatus according to claim 16, wherein the blurring degree data comprises blurring radius data; and the performing blurring processing on the original photographed image according to the blurring degree data of the at least one pixel point to generate a post-processing result image comprises:

using the blurring radius data of the at least one pixel point as a parameter value of a Gaussian kernel function, and performing blurring processing on the at least one pixel point of the original photographed image by using a Gaussian blur method to generate the post-processing result image; or determining an average kernel width of each of the at least one pixel point according to the blurring radius data of the at least one pixel point, and performing blurring processing on the at least one pixel point of the original photographed image by using an average blur method to generate the post-processing result image; or using the blurring radius data of the at least one pixel point as a circle radius value, and performing blurring processing on the at least one pixel point of the original photographed image by using a circular blur method to generate the post-processing result image.

18. An image processing apparatus, comprising:

a memory storing processor-executable instructions; and a processor, configured to execute the stored processor-executable instructions to perform operations of the image processing method according to claim 13.

19. A non-transitory computer readable storage medium having stored thereon instructions that, when executed by a processor, cause the processor to implement the image processing method according to claim 1.

20. A non-transitory computer readable storage medium having stored thereon instructions that, when executed by a processor, cause the processor to implement the image processing method according to claim 13.

* * * * *